Nov. 3, 1931. C. E. BUNKER 1,830,261
STRIKER LIFTING MEANS FOR TRAPS
Filed April 27, 1929
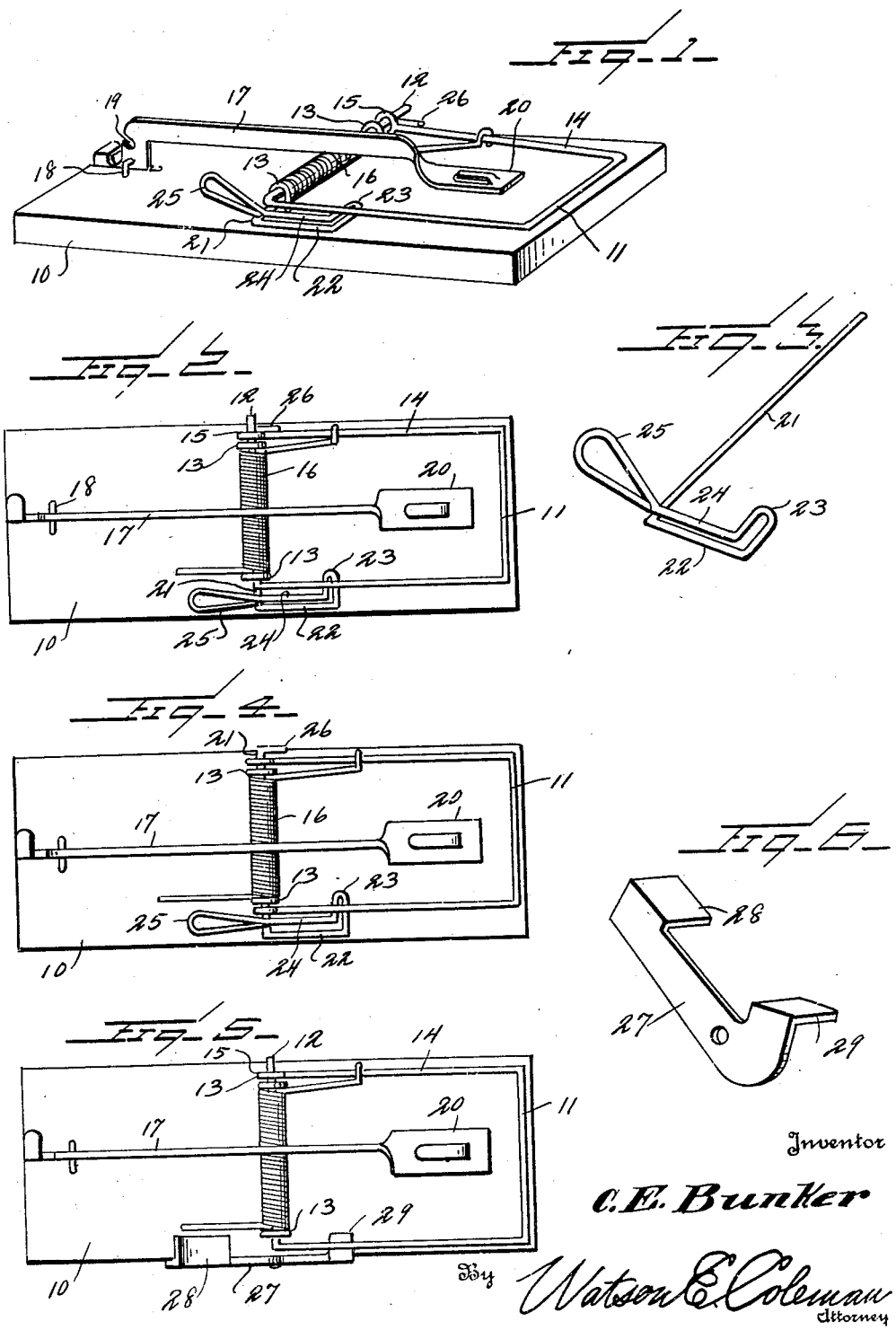
Inventor
C. E. Bunker
By Watson E. Coleman
Attorney Patented Nov. 3, 1931

1,830,261

UNITED STATES PATENT OFFICE

CAREY E. BUNKER, OF OREGON, MISSOURI

STRIKER LIFTING MEANS FOR TRAPS

Application filed April 27, 1929. Serial No. 358,681.

This invention relates to traps and to traps of that character in which a base is provided having a spring actuated striking member held in a retracted position by a latch, the latch being connected to a trip, the release of the trip permitting the striking member to turn through an arc of a circle and strike the animal who has tripped the trap, breaking its back or otherwise killing or trapping it.

The general object of the present invention is to provide means whereby the striker may be released or lifted from the stricken animal without the fingers of the trapper's hands touching the animal and to provide in this connection a release lever which does not in any way impede the action of the striking member when it springs over and traps the animal, but which is so constructed and mounted that it affords a finger piece which when depressed will lift the striker from the animal, this device further serving to facilitate setting the trap.

Other objects will appear in the course of the following description.

My invention is illustrated in the accompanying drawings, wherein:—

Figure 1 is a perspective view of a trap constructed in accordance with my invention;

Figure 2 is a plan view of the trap shown in Figure 1;

Figure 3 is a perspective view of the striker lifting arm detached;

Figure 4 is a top plan view of a slight modification;

Figure 5 is a plan view of another modification;

Figure 6 is a perspective view of the lifting arm separated from the trap and as shown in Figure 5.

Referring to these drawings, 10 designates the base of the trap which may be made of wood or any other suitable material such as is commonly used in making traps of this character. Oscillatably mounted upon this base is a striker 11 which in Figure 1 is shown as an approximately rectangular wire frame, bent so as to provide a cross bar 12. This is mounted upon the base by means of the staples 13. One arm 14 of the striker is formed with a loop 15 through which the cross bar 12 extends. A coiled spring 16 is disposed around this cross bar 12, one end of this coiled spring being extended and operatively connected to one of the arms of the striker while the other end is extended and bears against the base 10, this coiled spring acting to urge the striker to its trapping position. The striker 11 may be held in its retracted or set position by any suitable means, but I have shown for this purpose the means illustrated in my pending application for patent, Serial No. 348,244, filed March 19, 1929. This means as shown consists of a latch member 17 pivoted upon a staple 18 and formed immediately above the pivot with a notch 19.

This latch has a shank extending longitudinally of the trap and provided at its free end with a bait engaging or supporting plate 20. When the striker is turned to its "set" position the cross bar forming the free end of the striker is engaged in the notch 19 and the striker is held retracted against the action of the spring. When the bait end of the latch is depressed by an animal, it withdraws the notch from its engagement with the cross bar of the striker and the striker flies over upon the animal.

I do not wish to be limited to the particular form of trigger or latch which I have illustrated as the common and ordinary means for latching the striker in its set position may be used. My invention relates to means whereby the striker may be lifted after it has struck the animal so as to permit the animal to be discharged from the trap. This lifting device is formed of a single length of wire preferably, though I do not wish to be limited to this, this wire as shown in Figure 3 being bent to form a transverse straight portion 21. At one end, this straight portion is angularly bent as at 22, then inwardly bent as at 23, then rebent upon itself and extended inward to the portion 22 as at 24 and then extended to form the loop or finger piece 25, this finger piece being disposed at an angle to the portions 23 and 22. The portions 23 and 22 constitute an arm, the portion 23 extending in a plane at right angles to the plane of the finger piece 25. The transverse portion 21 when used in connection with the striker 11 shown in Figure 1 is intended to be inserted through the staples 13 and either beneath or through the coil spring 16, the portion 23 of the arm constituted by the parts 22 and 24 being disposed beneath one longitudinal element of the striker as shown in Figure 1.

The other end of the transverse part 21, af er it has been inserted through the staples 13 is intended to be angularly bent at 26.

It will be seen that the finger piece 25 is disposed outward of the lateral portions of the striker 11 so that the striker is perfectly free to swing from its set position to its striking position, but that when it is in its striking position, it is disposed above the arm 22 and thus when the finger piece 25 is depressed, the striker may be raised against the force of the spring. The same form of lifting attachment may be used in connection with the striker shown in Figure 4 which is provided with eyes at the ends of its frame. In this case, the transverse portion 21 of the attachment constitutes a pin le extending through these eyes and through the spring and staples, the operation being precisely the same as previously described.

In Figure 5 I illustrate a lifter for the striker formed of bent metal and designated 27. This is angular in form to provide a finger piece 28 and a portion 29 lying beneath one arm of the striker. By pressing down upon the finger piece 25, the striker is raised as before described and this means for raising the striker may be used not only to release the animal from the trap without the necessity of touching the animal, but it also facilitates the setting of the trap. I have provided means whereby the striker may be lifted from the face of the base where it may be more readily handled and forced over into engagement with the trigger or latch.

While I have illustrated a number of embodiments of my invention, I do not wish to be limited to these as it is obvious that this device might be applied to modified forms of traps operating on the same principle.

I claim:—

In a trap having a striker and an elongated coil spring, a lifter for said striker comprising an elongated pivotal member extending through said spring, and a lifting member secured to said pivotal member and extending transversely thereof, said lifting member being longitudinally inclined and having one end thereof disposed in the path of said striker whereby to lift said striker upon depressing of the opposite end of said lifting member.

In testimony whereof I hereunto affix my signature.

CAREY E. BUNKER.